Feb. 14, 1956

J. G. MORGAN 2,734,825

PHOTOGRAPHIC FILMS

Filed June 16, 1953

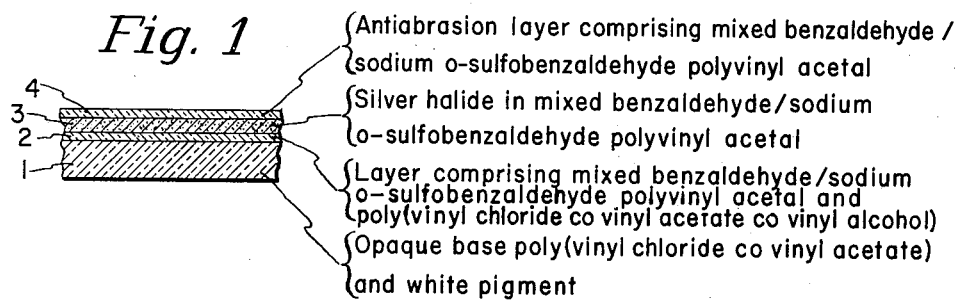

Fig. 1
- Antiabrasion layer comprising mixed benzaldehyde / sodium o-sulfobenzaldehyde polyvinyl acetal
- Silver halide in mixed benzaldehyde/sodium o-sulfobenzaldehyde polyvinyl acetal
- Layer comprising mixed benzaldehyde/sodium o-sulfobenzaldehyde polyvinyl acetal and poly(vinyl chloride co vinyl acetate co vinyl alcohol)
- Opaque base poly(vinyl chloride co vinyl acetate) and white pigment

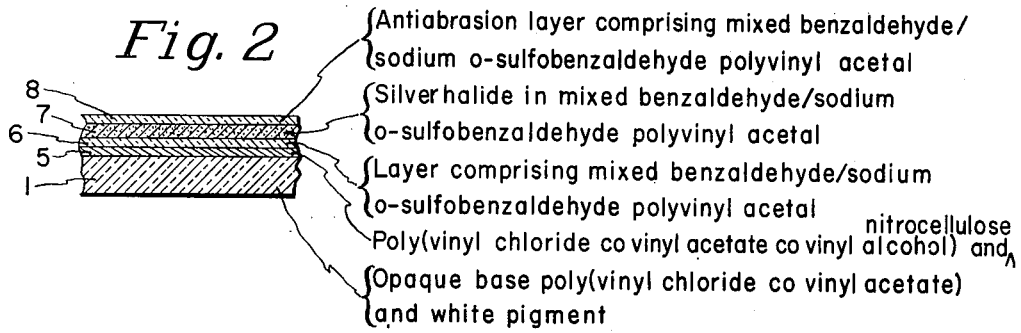

Fig. 2
- Antiabrasion layer comprising mixed benzaldehyde/ sodium o-sulfobenzaldehyde polyvinyl acetal
- Silver halide in mixed benzaldehyde/sodium o-sulfobenzaldehyde polyvinyl acetal
- Layer comprising mixed benzaldehyde/sodium o-sulfobenzaldehyde polyvinyl acetal
- Poly(vinyl chloride co vinyl acetate co vinyl alcohol) and nitrocellulose
- Opaque base poly(vinyl chloride co vinyl acetate) and white pigment

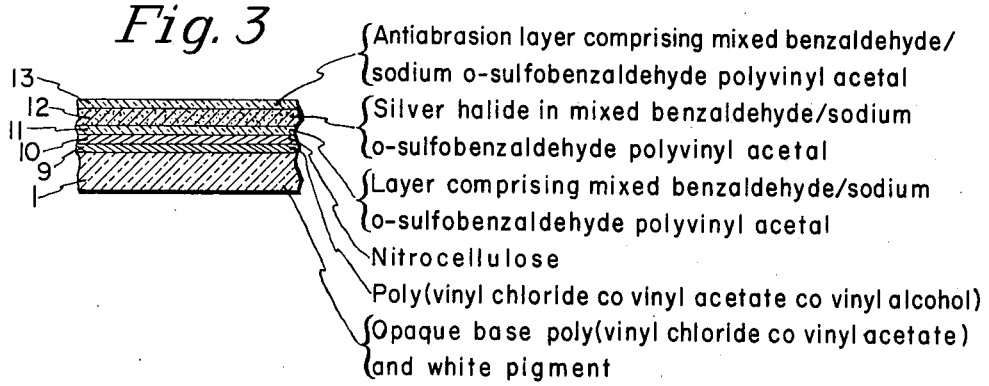

Fig. 3
- Antiabrasion layer comprising mixed benzaldehyde/ sodium o-sulfobenzaldehyde polyvinyl acetal
- Silver halide in mixed benzaldehyde/sodium o-sulfobenzaldehyde polyvinyl acetal
- Layer comprising mixed benzaldehyde/sodium o-sulfobenzaldehyde polyvinyl acetal
- Nitrocellulose
- Poly(vinyl chloride co vinyl acetate co vinyl alcohol)
- Opaque base poly(vinyl chloride co vinyl acetate) and white pigment

INVENTOR
JAMES GAIL MORGAN

BY *Lynn Barrett Morris*

ATTORNEY 2,734,825

PHOTOGRAPHIC FILMS

James Gail Morgan, New Brunswick, N. J., assignor to E. I. du Pont de Nemours and Company, Wilmington, Del., a corporation of Delaware Application June 16, 1953, Serial No. 362,159

8 Claims. (Cl. 95—9)

This invention relates to photography and more particularly to photographic films. Still more particularly it relates to heat moldable films.

Heat moldable films have been proposed which consist of a cellulose derivative or synthetic resin base and a silver halide emulsion layer wherein a thermoplastic resin or cellulose derivative is used as the binding agent for the silver halide.

An object of this invention is to provide an improved heat moldable film. Another object is to provide such a film which can be readily processed to a photographic picture after a heat-molding operation. Another object is to provide such a film which has good light-sensitive and developable characteristics after a heat-molding operation to conform to an irregular surface. A further object is to provide such a film wherein there is good adherence between all layers. Still other objects will be apparent from the following description of the invention.

It has been found that good heat-moldable photographic films can be made from silver halide dispersions in hydrophilic, macromolecular mixed acetals of vinyl alcohol polymers with benzaldehyde and an aliphatic or aromatic aldehyde containing a carboxylic or sulfonic acid or their alkali metal or ammonium salts, wherein the hydrocarbon radical is otherwise unsubstituted, by coating said dispersions onto a suitable anchoring substratum of a heat-moldable sheet of film.

The mixed acetals just described can be prepared by any conventional acetalization process from (a) any vinyl alcohol polymer which is water-soluble to hydrophilic in character, including (1) polyvinyl alcohol of high molecular weight (viscosity of 4% aqueous solution at 20° C., 40 to 60 centipoises), (2) polyvinyl alcohol of medium molecualr weight (viscosity of 4% aqueous solution at 20° C., 15 to 30 centipoises) which may be substituted with ester groups, e. g., acetate, and propionate groups, and (3) 75–100% hydrolyzed interpolymers of vinyl acetate with 0.05 to 0.5 mol equivalents of terminally unsaturated monoolefins, e. g., ethylene, such as described in United States Patent 2,386,347, and (4) completely hydrolyzed interpolymers of vinyl acetate with minor proportions (less than 50%) of polymerizable vinyl or vinylidene compounds, for example, vinyl chloride, vinyl cyanide, alkyl methacrylates, e. g., methyl and ethyl methacrylate, etc., (b) benzaldehyde, and (c) an aldehyde containing free carboxylic or sulfonic acid groups or water-soluble salts of such groups. For example, the acetalization may be conveniently carried out in solution or suspension in water or an organic solvent or diluent using a catalyst such as phosphoric acid, sulfuric acid, hydrochloric acid, etc. Suitable procedures and aldehydes are described in United States Patent 2,310,943 and in German Patent No. 643,650. The free acid groups can be converted into salt groups by a simple neutralization as described above and in the United States patent.

The dimethyl or diethyl or ethylene glycol acetals of the aldehydes of items (b) and (c) can be used instead of the free aldehydes if desired. Also an ethylene glycol reaction medium can be used. The hydrophilic macromolecular acetals useful in practicing the invention should have a vinyl alcohol content of 55 to 94%, a benzaldehyde content from 5 to 20%, and a solubilizing aldehyde content from 1 to 25%.

In the preferred aspect of the invention the polyvinyl acetals are made from polyvinyl alcohol or a polyvinyl ester which is at least 98% hydrolyzed and contain o-sulfobenzaldehyde (preferably sodium o-sulfobenzaldehyde) and benzaldehyde acetal groups. These preferred mixed acetals, of course, have the constituent proportions mentioned in the next preceding paragraph.

In practicing the invention a heat-moldable film base is provided with a suitable thin anchoring sublayer which is dried. An aqueous/ethanol dispersion of light-sensitive silver halides in a mixed polyvinyl acetal described above is coated onto the sublayer and the resulting layer dried. These operations are, of course, carried out under conditions such that no substantial quantity of actinic light radiation, which would expose the silver halides, is present.

The aqueous-ethanol dispersions of light-sensitive silver halides in the hydrophilic, macromolecular mixed polyvinyl acetal can be prepared by precipitating the silver halides in an aqueous/ethanol solution of said acetal by any conventional method of preparing silver halide dispersions in water-permeable colloids. Thus, a dilute aqueous/ethanol solution of a soluble inorganic halide, e. g., ammonium bromide, potassium iodide or potassium chloride, or mixtures of any of these, can be admixed with the aqueous/ethanol solution of said acetal and a diltue aqueous solution of a water-soluble silver salt, e. g., silver nitrate, sulfate, sulfamate, benzoate, acetate or citrate or a mixture of two or more of such salts. The two solutions can be added stepwise or simultaneously. After the solutions are mixed and the silver halide dispersion formed, the mixture is allowed to ripen at ordinary or moderately elevated temperatures, e. g., 25 to 50° C., until the silver halide grains acquire the desired grain size.

One practical heat-moldable film structure comprehended by the invention consists of a sheet of a poly(vinylchloride co vinyl acetate) wherein the former is present in an amount from 70 to 98% by weight of the copolymer, bearing in order a single sublayer comprising a poly(vinyl chloride co vinyl acetate co vinyl alcohol) and a compatible film-forming polymer, e. g., nitrocellulose, a hydrophilic, macromolecular mixed benzaldehyde/o-sulfobenzaldehyde polyvinyl acetal of the type described above, or a polyvinyl acetal containing carboxylic or sulfonic acid groups, or their water-soluble salts described in Woodward U. S. P. 2,462,151, etc., a layer of a light-sensitive silver halide in the hydrophilic, macromolecular mixed benzaldehyde/aldehyde (containing a solubilizing group) polyvinyl acetal described above and if desired an antiabrasion layer composed of one of the polyvinyl acetals described in this paragraph. The above layers can be applied by the conventional coating methods.

Another practical heat-moldable film has a support of the composition given in the next preceding paragraph, bearing in order a sublayer comprising a poly(vinyl chloride co vinyl acetate co vinyl alcohol) and nitrocellulose in a 3 to 1 weight ratio, a sublayer comprising a hydrophilic, macromolecular mixed benzaldehyde/o-sulfobenzaldehyde polyvinyl acetal of the type described above, and a layer of light-sensitive silver halide as described in the next preceding paragraph. If desirable, an antiabrasion layer composed of one of the mixed polyvinyl acetals is applied. The above layers can be applied by conventional coating methods.

In applying the light-sensitive polyvinyl acetal layer it is preferable to use a water-soluble boron compound capable of yielding borate ions, e. g., boric acid, as described in Weaver U. S. Patent 2,534,326. This causes rapid gelling of the light-sensitive layer. The boron compound can be included as a component of the sublayer on which the light-sensitive silver halide layer is coated.

In using the film, for instance, in making a contour map, the heat-moldable film is first molded under heat, then exposed to photographic negative pictures of terrain, and developed, washed and fixed in the same manner as a photographic paper print.

In the attached drawing which constitutes a part of the present specification:

Figure 1 is a cross-sectional view of the film element described in Example I;

Figure 2 is a cross-sectional view of the film element described in Example II; and Figure 3 is a cross-sectional view of the film element described in Example III.

The invention will be further illustrated but is not intended to be limited by the following examples. The percentages stated are by weight, unless otherwise indicated, and the processes are carried out in the substantial absence of actinic light rays.

*Example I*

A film base sheet 1, approximately 10 mils in thickness of a poly-87:13(vinyl chloride co vinyl acetate) which contained sufficient white pigment to render it light-opaque was provided with a thin anchoring sublayer 2 by coating its surface from a solution made by admixing the following components:

| | Percent |
|---|---|
| Mixed benzaldehyde (7 parts) sodium o-sulfobenzaldehyde (13 parts) polyvinyl acetal of polyvinyl alcohol (100 parts) (medium viscosity) | 1.5 |
| Ethanol (95%) | 26.57 |
| Acetone | 69.08 |
| Boric acid | 1.89 |
| Poly-91:3:6(vinyl chloride co vinyl acetate co vinyl alcohol) | 0.96 |

The sublayer was dried and an aqueous/ethanol dispersion of silver bromide in a mixed sodium o-sulfobenzaldehyde/benzaldehyde acetal made by reacting 100 parts of polyvinyl alcohol (medium viscosity) with 7 parts of the former and 13 parts of the latter aldehyde was coated onto the sublayer and dried. There was then coated on the emulsion layer 3 a thin antiabrasion layer 4 from an aqueous/ethanol solution of a mixed polyvinyl acetal obtained by acetalizing 100 parts of polyvinyl alcohol (medium viscosity) with 7 parts of sodium o-sulfobenzaldehyde and 13 parts of benzaldehyde.

The resulting heat-moldable film, after drying was placed emulsion side down over a plaster of Paris mold conforming to the contour of an area of terrain, said mold having a plurality of spaced vertical air-reduction holes and being disposed in a heat-molding apparatus (of the type described in Braund U. S. Patent 2,493,439). The apparatus was provided with a vacuum pump or aspirator to remove air between the film and the mold. A heat source at approximately 700° F. was placed in close proximity to the film for 5 to 15 seconds and a vacuum of about 28 inches of mercury applied beneath the mold for one second. The heat source was then removed. After cooling, the molded film was removed and placed on a photographic enlarging table where a negative photographic picture containing objects on the surface of the original terrain was projected in register with the contour of the molded film thereby exposing the light-sensitive surface of the formed photographic film. The exposure was about 10 to 15 seconds at F16 with a 1.3 times magnification. After exposure, the formed, exposed photographic film was processed as follows:

(1) Developed for five minutes at 70° F. in a solution made by admixing the following components:

| | | |
|---|---|---|
| Water | cc | 750.0 |
| N-methyl p-aminophenol·hydrosulfate | grams | 3.0 |
| Sodium sulfite (anhydrous) | do | 45.0 |
| Hydroquinone | do | 12.0 |
| Sodium carbonate monohydrate | do | 79.0 |
| Potassium bromide | do | 1.9 |
| Water to make 1 liter. | | |

(2) Rinsed in water at 65° F. for 30 seconds.

(3) Fixed for seven minutes at 68° F. in a solution made by admixing the following components:

| | | |
|---|---|---|
| Sodium thiosulfate crystals | grams | 240.0 |
| Sodium sulfite (anhydrous) | do | 15.0 |
| Borax | do | 18.0 |
| Glacial acetic acid | cc | 12.0 |
| Potassium alum | grams | 20.0 |
| Water to make 1 liter | | |

(4) Washed in water at 65° F. for 10 minutes and dried.

The heat moldable film of this example had good molding characteristics and there was excellent adherence between all layers during and after the heat-molding and photographic processing steps. The relief photograph of terrain was free from blisters and no cracking, buckling or "creasing" occurred uring the molding operation or subsequently.

*Example II*

A film base 1 as described in Example I was provided with a thin anchoring sublayer 5 by coating its surface from a solution made by admixing the following components:

| | Percent |
|---|---|
| Poly-91:3:6(vinylchloride co vinyl acetate co vinyl alcohol) | 3.0 |
| Nitrocellulose (nitrogen 11.75%–11.99%) | 1.0 |
| Acetone to 1000 ml | 96.0 |

The layer was dried and a thin layer 6 was applied to it from a solution containing 1.5% of a mixed sodium o-sulfobenzaldehyde/benzaldehyde acetal made by reacting 100 parts by weight of polyvinyl alcohol (medium viscosity) with 7 parts of the former and 13 parts of the latter aldehyde. The resulting layer was dried and a light-sensitive emulsion layer 7 was applied from an aqueous/ethanol dispersion of silver bromide in a mixed sodium o-sulfobenzaldehyde/benzaldehyde acetal made by reacting 100 parts of polyvinyl alcohol (medium viscosity) with 7 parts of the former and 13 parts of the latter aldehyde. There was then coated on the emulsion layer a thin antiabrasion layer 8 from an aqueous/ethanol solution of a mixed polyvinyl acetal obtained by acetalizing 100 parts of polyvinyl alcohol (medium viscosity) with 7 parts sodium o-sulfobenzaldehyde and 13 parts benzaldehyde. The resulting film after drying was converted into a molded photograph in the same manner as described in Example I and it had similar characteristics.

*Example III*

A film base 1 as described in Example I was provided with a thin anchoring sublayer 9 by coating its surface with a solution made by admixing the following components:

| | Percent |
|---|---|
| Poly-91:3:6(vinyl chloride co vinyl acetate co vinyl alcohol) | 10 |
| Acetone | 90 |

On the sublayer there was then coated a thin nitrocellulose layer 10 from a solution of nitrocellulose (nitrogen 11.75% to 11.99%) in acetone. The layer was dried and a thin layer 11 was applied to it from an aqueous solution containing 1.5% of a mixed o-sulfobenzaldehyde/benzaldehyde polyvinyl acetal made by reacting 100 parts by weight of polyvinyl alcohol (medium viscosity) with 7 parts of the former and 13 parts of the latter aldehyde. A light-sensitive silver halide emulsion layer 12 was then applied from an aqueous/ethanol dispersion of silver bromide in a mixed sodium o-sulfobenzaldehyde/benzaldehyde acetal made by reacting 100 parts of polyvinyl alcohol (medium viscosity) with 7 parts of the former and 13 parts of the latter aldehyde. There was then coated on the emulsion layer a thin antiabrasion layer 13 from an aqueous/ethanol solution of a mixed polyvinyl acetal obtained by acetalizing 100 parts of polyvinyl alcohol (medium viscosity) with 7 parts of sodium o-sulfobenzaldehyde and 13 parts of benzaldehyde. The resulting film, after drying, was converted into a molded photograph in the same manner as described in Example I with similar characteristics.

Additional heat-moldable photographic films of the type described in Examples I, II and III are made by substituting for the mixed benzaldehyde sodium o-sulfobenzaldehyde polyvinyl acetals used in the sublayers, light-sensitive emulsion layers, and antiabrasion layers in the films of such examples, mixed polyvinyl acetals containing the following proportions of components:

1. 100 parts of polyvinyl alcohol acetalized by reaction with 4 parts sodium o-sulfobenzaldehyde and 13 parts benzaldehyde,
2. 100 parts of polyvinyl alcohol acetalized by reaction with 14 parts sodium o-sulfobenzaldehyde and 13 parts benzaldehyde,
3. 100 parts of polyvinyl alcohol acetalized by reaction with 22 parts sodium o-sulfobenzaldehyde and 13 parts benzaldehyde,
4. 100 parts of polyvinyl alcohol acetalized by reaction with 2 parts sodium o-sulfobenzaldehyde and 8.5 parts benzaldehyde.

These films, when processed in like manner, had similar properties.

While the above examples are all directed to the use of the preferred mixed benzaldehyde sodium o-sulfobenzaldehyde acetals similar films can be made by substituting like proportions of acetals of other aromatic or aliphatic aldehydes containing free carboxylic or sulfonic acid groups or their alkali metal or ammonium salts as described above. These acetals, and particularly those made from o-sulfobenzaldehyde, have excellent water-permeable characteristics and readily absorb developing solutions so that good photographic silver images can be made. The layers have extraordinary resistance to chemical fog which is induced by heat. These desirable characteristics are not possessed by polyvinyl acetals made from aliphatic aldehydes, aromatic aldehydes or mixed aliphatic/aromatic aldehydes free from solubilizing groups.

The silver halide emulsion may contain various adjuvants including sensitizing dyes, fog inhibitors, e. g., benzotriazole, 5-mercaptotetrazoles, 5-mercapto-1, 3,4-triazoles, 1-phenyl-5-mercaptotetrazoles, wetting agents of the anionic, cationic and non-ionic type including sodium alkyl sulfates and sulfonates and C- and N-alkylbetaines wherein the alkyl groups contain 8 to 18 carbon atoms.

The particular combination of benzaldehyde and o-sulfobenzaldehyde acetal groups, etc., has unique properties and the novel relationship of layers described above provides a heat-moldable film having photographic characteristics similar to the best commercial photographic papers.

The film bases used in accordance with the invention should mold readily to conform to an irregular surface like that in a relief map of rugged terrain at temperatures between 150 and 300° F. and retain their structural strength after the molding operation. The poly(vinyl chloride co vinyl acetates) containing more than 70% of the former and at least 2% of the latter are especially useful for such purposes. Other useful bases include polystyrene, polyethylene, cellulose acetate, cellulose butyrate, and non-oriented poly(ethylene terephthalate). The bases preferably contain an opacifier. Suitable ones include titanium oxide and zirconium oxide and mixtures.

The heat-moldable films of this invention can be used for various purposes where a photographic image or picture is desired on an irregular surface. Thus, it can be used for various decorative purposes, wall plaques, lamp shades, etc. It is especially useful in the preparation of relief maps for military and other purposes. They can be heat molded at temperatures as high as 300° F. without impairing the excellent adherence between the base and coated layers nor their photographic properties.

The heat-moldable films of this invention may be exposed, processed and then molded, or in alternate procedure, may be exposed, molded and then processed without impairing the excellent adhesion between the base and coated layers, nor the fidelity of the forming qualities, nor the photographic properties of the films.

An advantage of the invention resides in the fact that the photographic qualities of the light-sensitive heat-moldable film are not affected deleteriously by the heat-molding operation. An additional advantage resides in the fact that the light-sensitive layer has excellent permeability to the developing, washing, and fixing solutions after the heat-molding operation. Another advantage is that the heat-molding operation does not cause any fogging of the emulsion layer. An important advantage of the films is that the resulting photograph does not contain any objectionable color stain. The emulsion layer, moreover, has good silver halide uniformity after the heat-molding operation. A further advantage of the invention is that it provides heat-moldable films of good speed and contrast which are capable of making photographic relief maps in a rapid manner and conforming to the original mold.

What is claimed is:

1. A heat-moldable photographic film comprising a flexible base sheet composed of a poly(vinyl chloride co vinyl acetate), predominating in vinyl chloride, and a white pigment as an opacifying agent, bearing in order on one surface a sublayer composed of a mixture of a poly(vinyl chloride co vinyl acetate co vinyl alcohol) and nitrocellulose, a layer composed of a hydrophilic macromolecular mixed benzaldehyde/sodium o-sulfobenzaldehyde polyvinyl acetal, and a light-sensitive layer comprising silver halide grains dispersed in a hydrophilic, macromolecular mixed benzaldehyde/o-sulfobenzaldehyde polyvinyl acetal.

2. A heat-moldable photographic film comprising a flexible base sheet composed of a poly(vinyl chloride co vinyl acetate), predominating in vinyl chloride, and a white pigment as an opacifying agent, bearing in order on one surface, a sublayer composed of a mixture of a poly(vinyl chloride co vinyl acetate co vinyl alcohol) and nitrocellulose, a layer composed of a hydrophilic macromolecular mixed benzaldehyde/sodium o-sulfobenzaldehyde polyvinyl acetal, a light-sensitive layer comprising silver halide grains dispersed in a hydrophilic, macromolecular mixed benzaldehyde/o-sulfobenzaldehyde polyvinyl acetal, and an antiabrasion layer composed of a hydrophilic, macromolecular mixed benzaldehyde/o-sulfobenzaldehyde polyvinyl acetal.

3. A heat-moldable photographic film comprising a flexible base sheet composed of a poly(vinyl chloride co vinyl acetate), predominating in vinyl chloride, and a white pigment as an opacifying agent, bearing in order on one surface a sublayer composed of a mixture of a poly(vinyl chloride co vinyl acetate co vinyl alcohol) and nitrocellulose, from one to two nitrocellulose layers, a layer composed of a hydrophilic macromolecular mixed benzaldehyde/sodium o-sulfobenzaldehyde polyvinyl acetal, and a light-sensitive layer comprising silver halide grains dispersed in a hydrophilic, macromolecular mixed benzaldehyde/o-sulfobenzaldehyde polyvinyl acetal.

4. A heat-moldable photographic film comprising a flexible base sheet composed of a poly(vinyl chloride co vinyl acetate), predominating in vinyl chloride, and a white pigment as an opacifying agent, bearing in order on one surface a sublayer composed of a mixture of a poly(vinyl chloride co vinyl acetate co vinyl alcohol) and nitrocellulose, from one to two nitrocellulose layers, a layer composed of a hydrophilic macromolecular mixed benzaldehyde/sodium o - sulfobenzaldehyde polyvinyl acetal, a light-sensitive layer comprising silver halide grains dispersed in a hydrophilic, macromolecular mixed benzaldehyde/o-sulfobenzaldehyde polyvinyl acetal, and an antiabrasion layer composed of a hydrophilic, macromolecular mixed benzaldehyde/o - sulfobenzaldehyde polyvinyl acetal.

5. A heat-moldable photographic film element comprising a base sheet of a water-insensitive film which is moldable at temperatures between 150° F. and 300° F. bearing on one surface in order, a thin anchoring sublayer comprising a poly(vinyl chloride co vinyl acetate co vinyl alcohol) and a compatible film-forming polymer taken from the group consisting of nitrocellulose, polyvinyl acetals containing sulfonic acid groups, polyvinyl acetals containing carboxylic acid groups and the water-soluble salts of such acetals, and a light-sensitive layer comprising silver halide grains dispersed in a macromolecular mixed polyvinyl acetal of a vinyl alcohol polymer with benzaldehyde and with an aldehyde containing a solubilizing group taken from the class consisting of aliphatic and aromatic aldehydes containing carboxylic acid groups, aliphatic and aromatic aldehydes containing sulfonic acid groups and their water-soluble salts, said groups being the sole substituent groups attached to the hydrocarbon nucleus of the said aldehydes, which acetals are hydrophilic in character.

6. A heat-moldable photographic film element comprising a base sheet composed of a poly(vinyl chloride co vinyl acetate), predominating in vinyl chloride, bearing on one surface in order, a thin anchoring sublayer comprising a poly(vinyl chloride co vinyl acetate co vinyl alcohol) and a compatible film-forming polymer taken from the group consisting of nitrocellulose, polyvinyl acetals containing sulfonic acid groups, polyvinyl acetals containing carboxylic acid groups and the water-soluble salts of such acetals, and a light-sensitive layer comprising silver halide grains dispersed in a macromolecular mixed polyvinyl acetal of a vinyl alcohol polymer with benzaldehyde and with an aldehyde containing a solubilizing group taken from the class consisting of aliphatic and aromatic aldehydes containing carboxylic acid groups, aliphatic and aromatic aldehydes containing sulfonic acid groups and their water-soluble salts, said groups being the sole substituent groups attached to the hydrocarbon nucleus of the said aldehydes, which acetals are hydrophilic in character.

7. A film element as set forth in claim 6 wherein said mixed acetal contains 5 to 20% of benzaldehyde and 1 to 25% of sodium o-sulfobenzaldehyde.

8. A heat-moldable photographic film element comprising a base sheet composed of a poly(vinyl chloride co vinyl acetate), predominating in vinyl chloride, bearing on one surface in order, a thin anchoring sublayer comprising a poly(vinyl chloride co vinyl acetate co vinyl alcohol) and a compatible film-forming polymer taken from the group consisting of nitrocellulose, polyvinyl acetals containing sulfonic acid groups, polyvinyl acetals containing carboxylic acid groups and the water-soluble salts of such acetals, a light-sensitive layer comprising silver halide grains dispersed in a macromolecular mixed polyvinyl acetal of a vinyl alcohol polymer with benzaldehyde and with an aldehyde containing a solubilizing group taken from the class consisting of aliphatic and aromatic aldehydes containing carboxylic acid groups, aliphatic and aromatic aldehydes containing sulfonic acid groups and their water-soluble salts, said groups being the sole substituent groups attached to the hydrocarbon nucleus of the said aldehydes, which acetals are hydrophilic in character, and an anti-abrasion layer composed of a hydrophilic macromolecular mixed benzaldehyde/sodium o-sulfobenzaldehyde polyvinyl acetal.

References Cited in the file of this patent

UNITED STATES PATENTS

| | | |
|---|---|---|
| 2,310,943 | Dorough et al. | Feb. 16, 1943 |
| 2,380,032 | Dorough et al. | July 10, 1945 |
| 2,415,381 | Woodward | Feb. 4, 1947 |
| 2,534,326 | Weaver | Dec. 19, 1950 |